US012780615B2

(12) United States Patent
Beach

(10) Patent No.: US 12,780,615 B2
(45) Date of Patent: Nov. 3, 2026

(54) SYSTEMS AND METHODS FOR HANDLING A WORKPIECE AND METHODS FOR MODIFYING LIFTS

(71) Applicant: The Boeing Company, Arlington, VA (US)

(72) Inventor: Brent A. Beach, Chesterfield, MO (US)

(73) Assignee: The Boeing Company, Arlington, VA (US)

( * ) Notice: Subject to any disclaimer, the term of this patent is extended or adjusted under 35 U.S.C. 154(b) by 600 days.

(21) Appl. No.: 18/463,468

(22) Filed: Sep. 8, 2023

(65) Prior Publication Data

US 2025/0083929 A1 Mar. 13, 2025

(51) Int. Cl.
*B66C 1/42* (2006.01)

(52) U.S. Cl.
CPC ...................................... *B66C 1/42* (2013.01)

(58) Field of Classification Search
CPC ........... B66C 1/42; B66C 1/422; B66C 1/425; B66C 1/427
See application file for complete search history.

(56) References Cited

U.S. PATENT DOCUMENTS 4,358,143 A * 11/1982 Cullen ................. B65H 19/123 294/93
4,925,225 A * 5/1990 Dost ..................... B66C 1/0293 294/186
6,345,850 B1 * 2/2002 Foust .................... B66C 1/0256 414/627
8,070,203 B2 * 12/2011 Schaumberger ...... B66C 1/0218 294/186
9,061,868 B1 * 6/2015 Paulsen ................. B66C 1/0218
12,134,527 B2 * 11/2024 Secibovic .............. B21D 43/18
2003/0143062 A1 * 7/2003 Bennison .............. B66C 1/0256 294/183
2020/0269391 A1 * 8/2020 Theissen .................. B23Q 7/04
2021/0310263 A1 * 10/2021 Zhang .................... B25J 11/005

OTHER PUBLICATIONS

Ergonomic Partners: Ergonomic Lifting Tools, "Vacuum, Magnetic, and Pneumatic Ergonomic Lift Assist Devices," (2023). https://www.ergonomicpartners.com/ergonomic-lift-assist.
Ergonomic Partners: video of vacuum-operated lift https://www.ergonomicpartners.com/video/vacuum-lifter-for-aircraft-parts.mp4.

* cited by examiner

*Primary Examiner* — George Sun
(74) *Attorney, Agent, or Firm* — Walters & Wasylyna LLC

(57) ABSTRACT

A lift includes a lift-arm, a joint that is coupled to the lift-arm, and a lift-frame that is coupled to the joint, opposite the lift-arm. The lift includes a gripper that is coupled to the lift-frame. The lift includes a lift-drive assembly that revolves the lift-frame about a lift-axis that is parallel to a pitch-axis of the lift-frame and relative to the lift-arm. The lift includes a roll-drive assembly that revolves the lift-frame about a joint-axis that is parallel to a roll-axis of the lift-frame and relative to the lift-arm.

20 Claims, 14 Drawing Sheets

SYSTEMS AND METHODS FOR HANDLING A WORKPIECE AND METHODS FOR MODIFYING LIFTS

FIELD

The present disclosure relates generally to material handling and, more particularly, to systems and methods for handling and manipulating a workpiece using lifts. The present disclosure is further directed to methods for modifying lifts to improve handling.

BACKGROUND

Handling large and/or heavy articles can be physically straining on an operator. Various devices are available to assist the operator in lifting and manipulating such articles. However, these devices are limited in the degrees of freedom available for manipulation and/or control. Accordingly, those skilled in the art continue with research and development efforts in the application of viscous material to surfaces of fasteners.

SUMMARY

Disclosed are examples of a lift, a system handling a workpiece, a method for handling a workpiece, and a method for modifying a lift. The following is a non-exhaustive list of examples, which may or may not be claimed, of the subject smatter according to the present disclosure.

In an example, the disclosed lift includes a lift-arm, a joint that is coupled to the lift-arm, and a lift-frame that is coupled to the joint, opposite the lift-arm. The lift includes a gripper that is coupled to the lift-frame. The lift includes a lift-drive assembly that revolves the lift-frame about a lift-axis that is parallel to a pitch-axis of the lift-frame and relative to the lift-arm. The lift includes a roll-drive assembly that revolves the lift-frame about a joint-axis that is parallel to a roll-axis of the lift-frame and relative to the lift-arm.

In an example, the disclosed system includes a mobile platform and a lift-arm that is coupled to the mobile platform. The mobile platform moves the lift-arm. The lift system includes a joint that is coupled to the lift-arm and a lift-frame that is coupled to the joint, opposite the lift-arm. The lift system includes a gripper that is coupled to the lift-frame. The system includes a lift-drive assembly that revolves the lift-frame about a lift-axis that is parallel to a pitch-axis of the lift-frame and relative to the lift-arm. The lift system includes a roll-drive assembly that revolves the lift-frame about a joint-axis that is parallel to a roll-axis of the lift-frame and relative to the lift-arm. The lift system includes a controller that operates the mobile platform, the lift-drive assembly, and the roll-drive assembly.

In an example, the disclosed method for manipulating includes steps of: (1) revolving a lift-frame of a lift about a lift-axis to a first orientation relative to a lift-arm of the lift, wherein the lift-axis is parallel to a pitch-axis of the lift-frame; (2) with the lift-frame in the first orientation, engaging the workpiece with a gripper that is coupled to the lift-frame; (3) with the gripper engaged to the workpiece, revolving the lift-frame about the lift-axis to a second orientation relative to the lift-arm; and (3) revolving the lift-frame about a joint-axis relative to the lift-arm, wherein the joint-axis is parallel to a roll-axis of the lift-frame.

In an example, the disclosed method for modifying includes steps of: (1) separating a lift-arm and a lift-frame of a lift; (2) coupling the lift-arm to a joint; (3) coupling the lift-frame to the joint, opposite the lift-arm, such that the lift-frame is revolvable relative to the lift-arm about a lift-axis that is parallel to a pitch-axis of the lift-frame and such that the lift-frame is revolvable relative to the lift-arm about a joint-axis that is parallel to a roll-axis of the lift-frame; (4) coupling a lift-drive assembly to the lift-arm and to the joint such that actuation of the lift-drive assembly revolves the lift-frame relative to the lift-arm about the lift-axis; and (5) coupling a roll-drive assembly to the lift-frame and to the joint such that actuation of the roll-drive assembly revolves the lift-frame relative to the lift-arm about the joint-axis.

Other examples of the lift, the system, and the methods will become apparent from the following detailed description, the accompanying drawings, and the appended claims.

DETAILED DESCRIPTION

Figure 1:
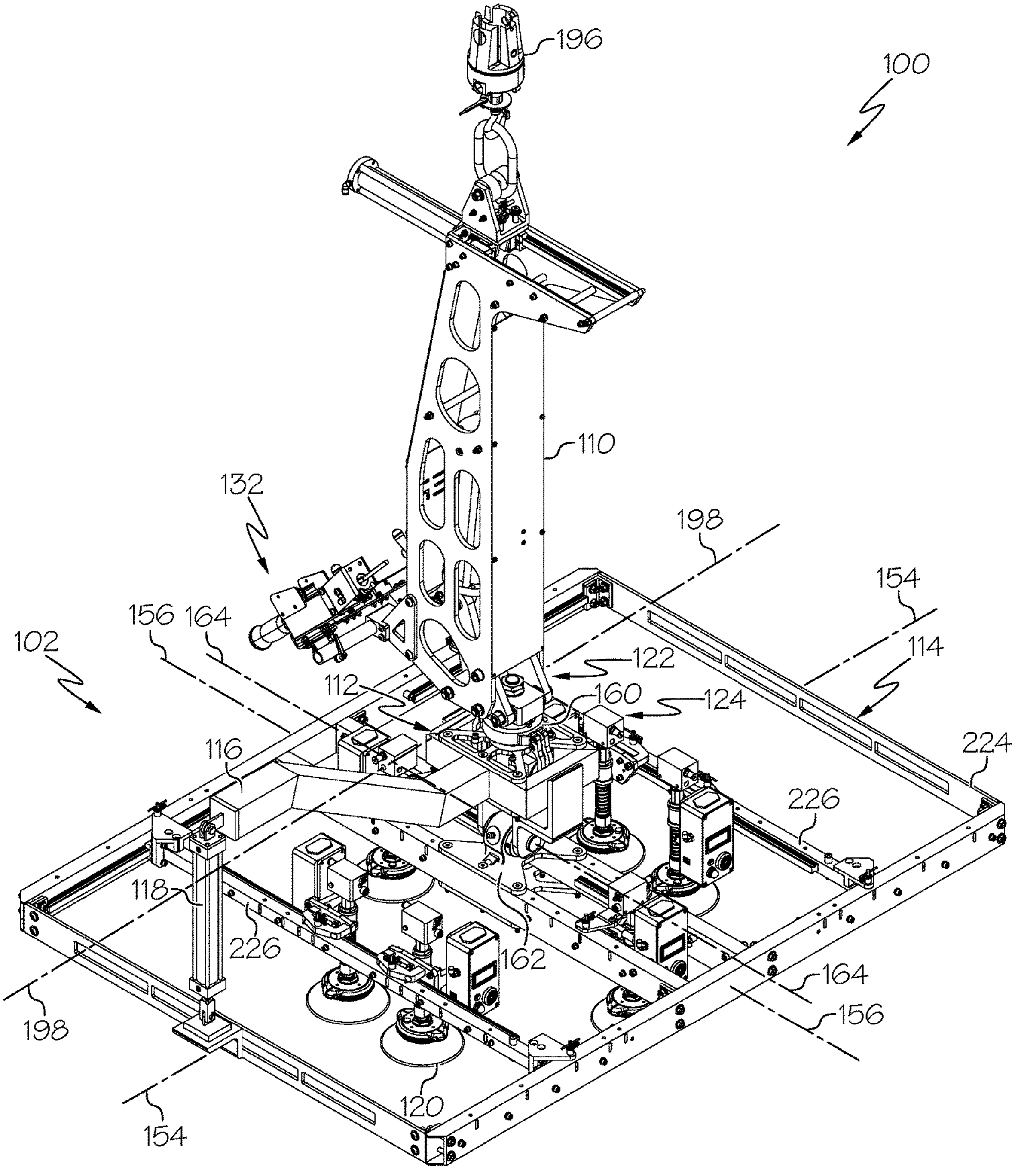
FIG. 1 is a schematic, perspective view of an example of a lift for handling a workpiece depicted in a first orientation.
Figure 2:
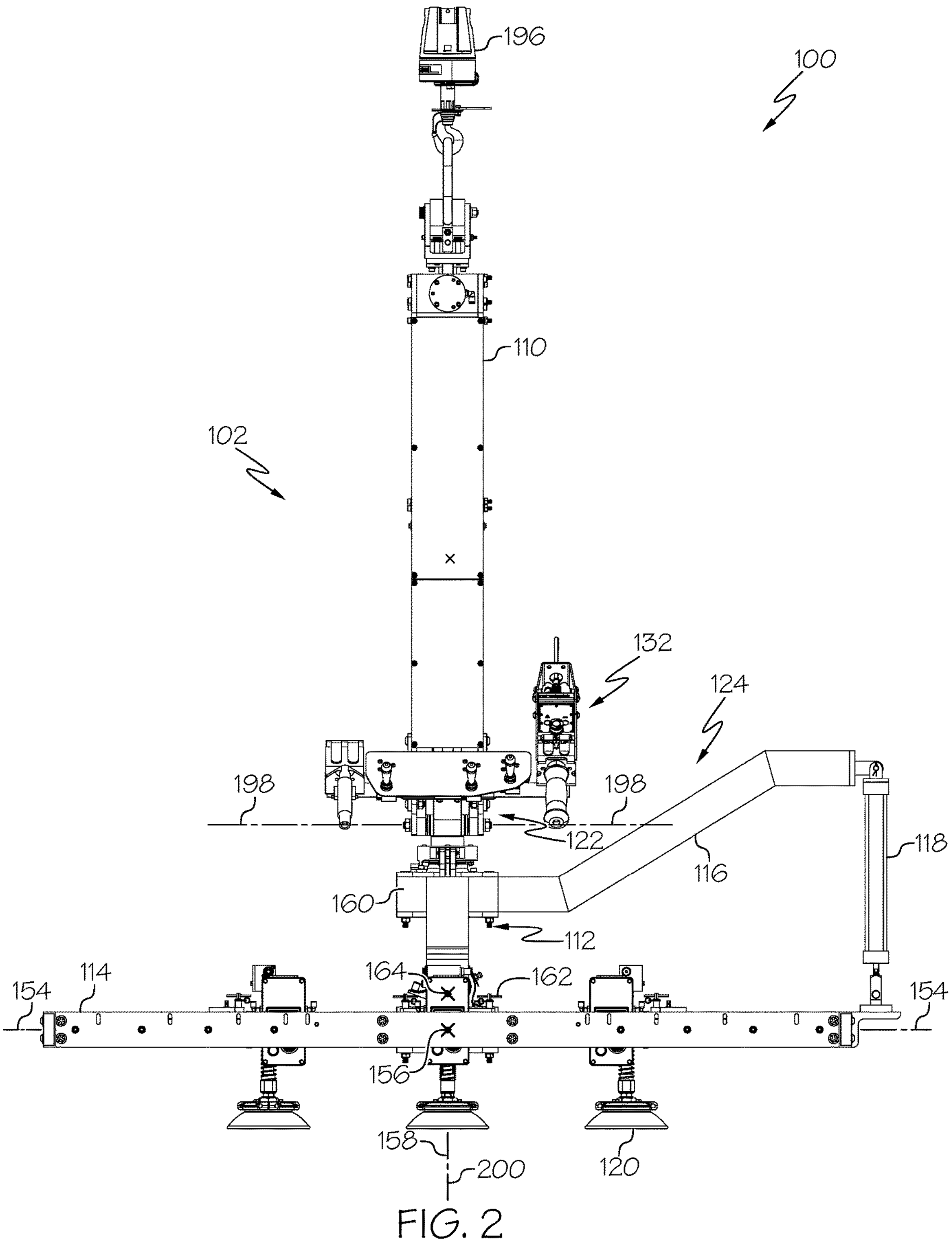
FIG. 2 is a schematic, elevation view of an example of the lift of FIG. 1.
Figure 3:
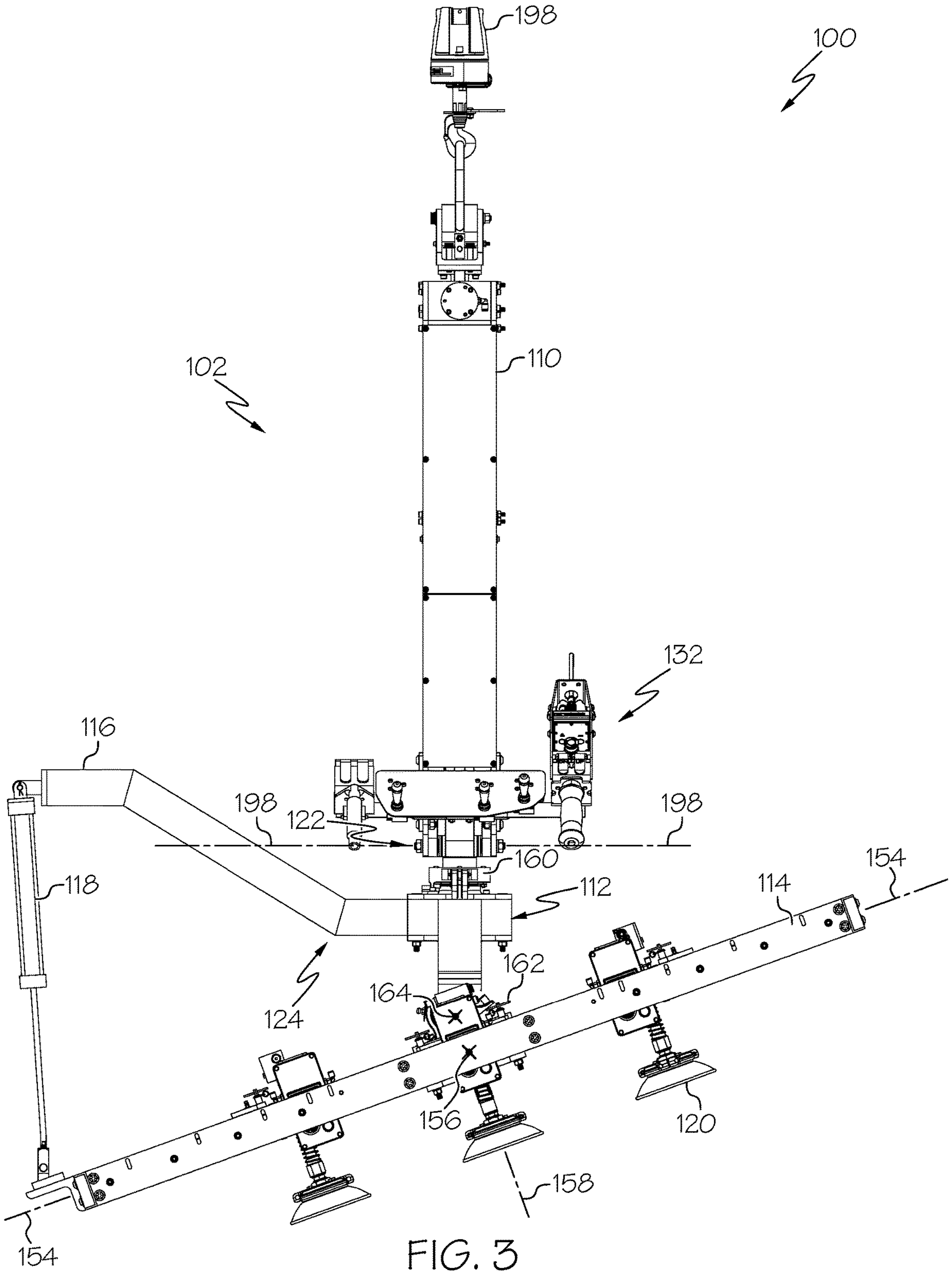
FIG. 3 is schematic, elevation view of an example of the lift in the first orientation with a lift-frame rotated relative to lift-arm.
Figure 4:
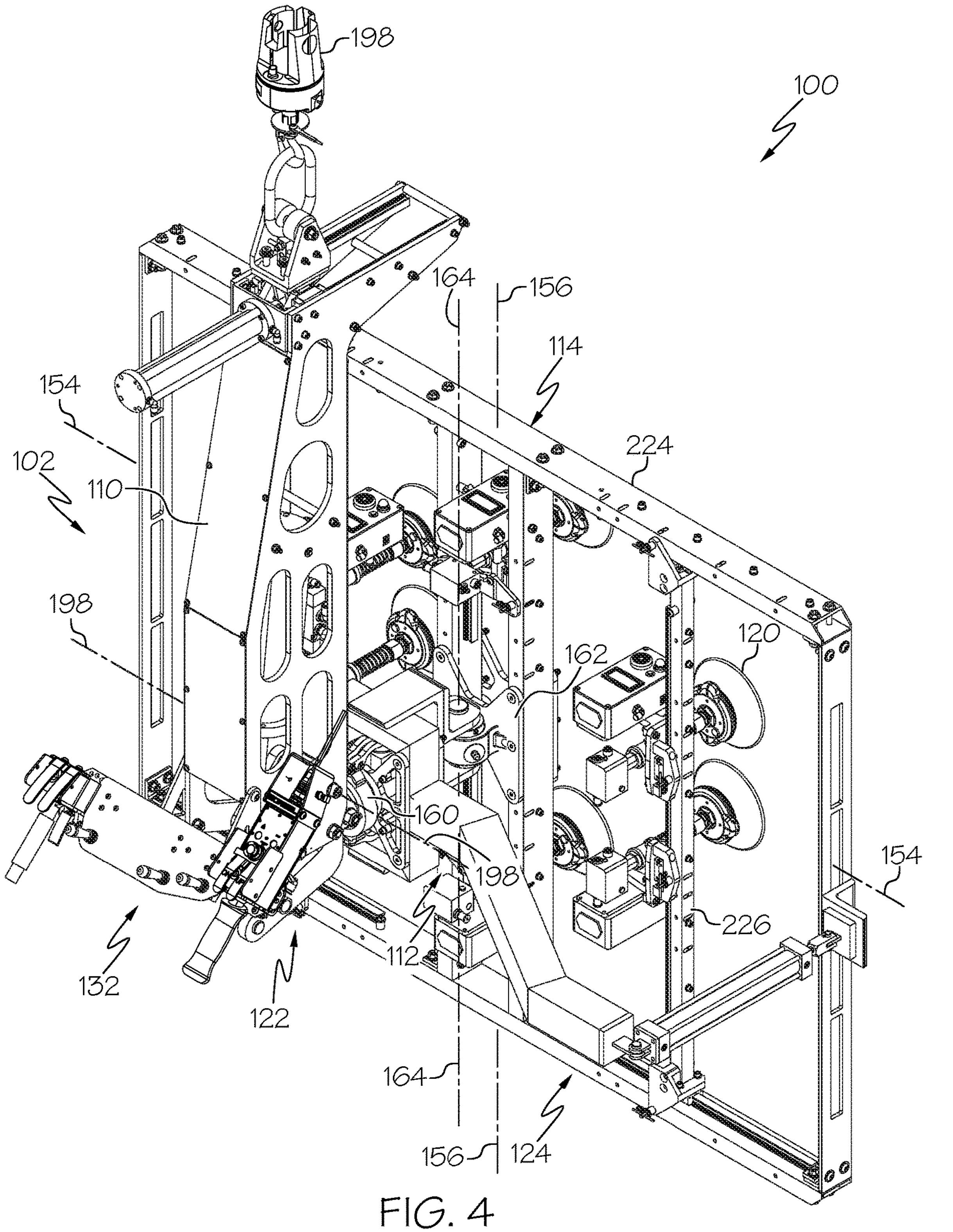
FIG. 4 is a schematic, perspective view of an example of the lift in a second orientation.
Figure 5:
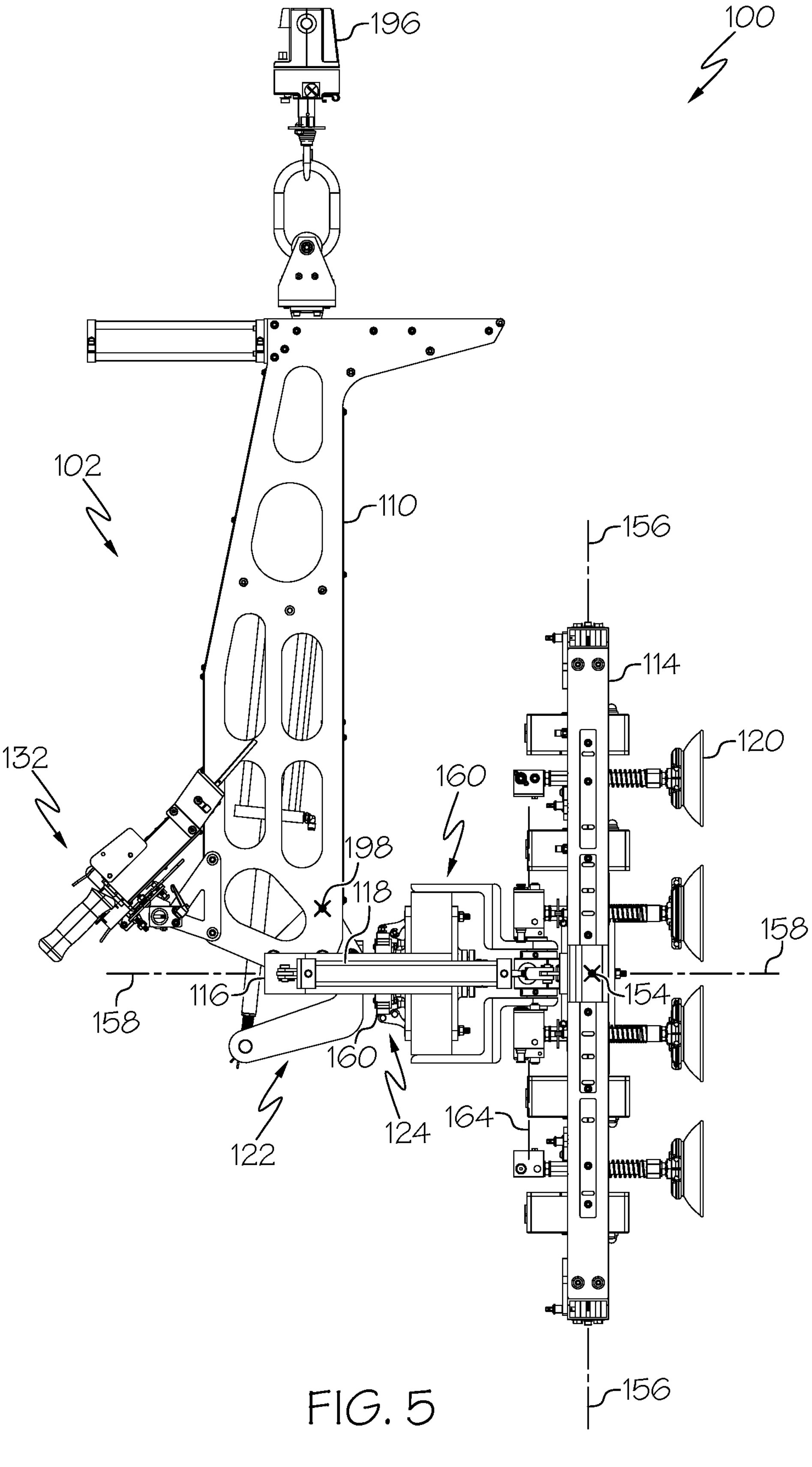
FIG. 5 is a schematic, elevation view of an example of the lift of FIG. 4.
Figure 6:
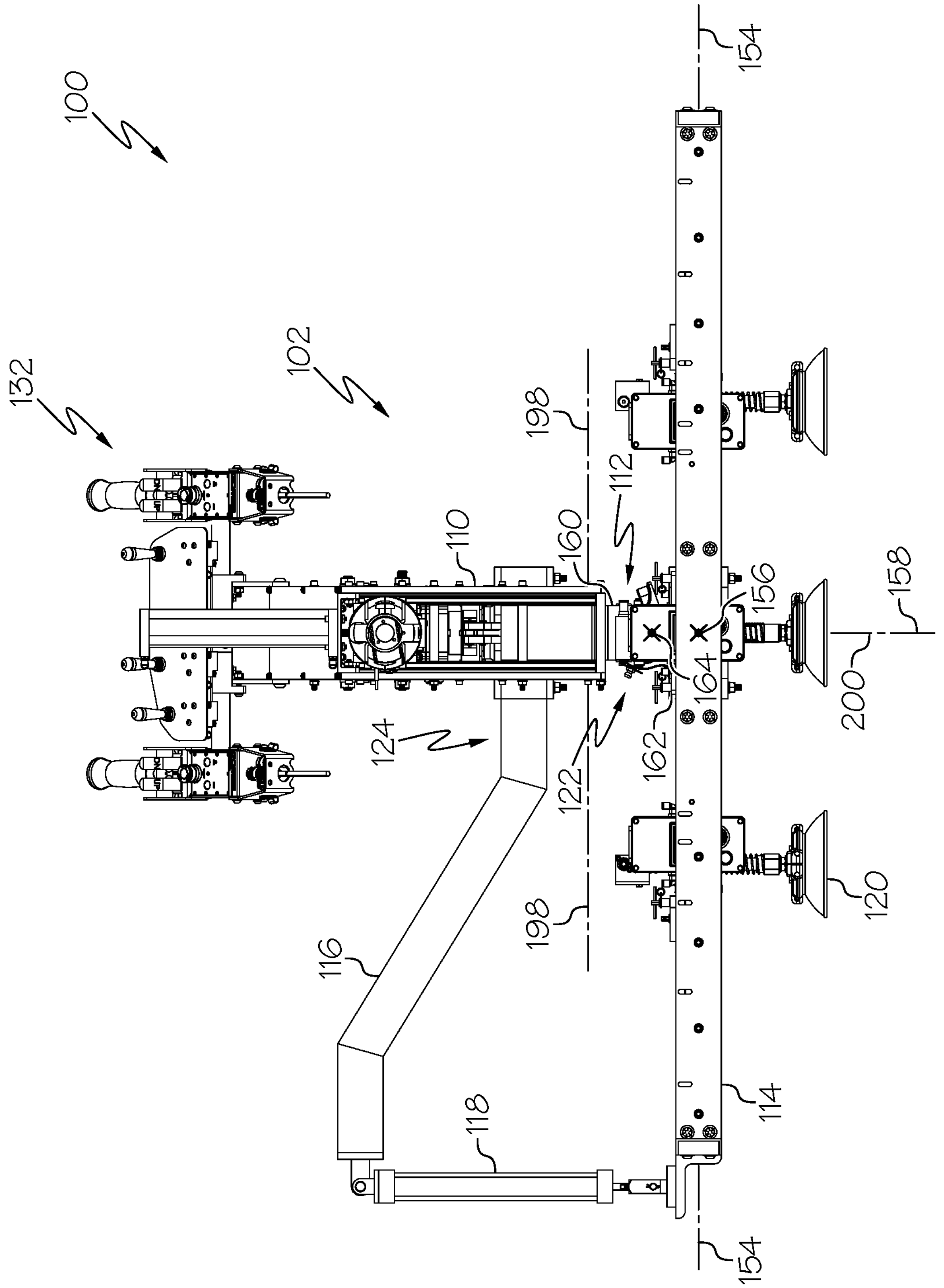
FIG. 6 is a schematic, plan view of an example of the lift of FIG. 4.
Figure 7:
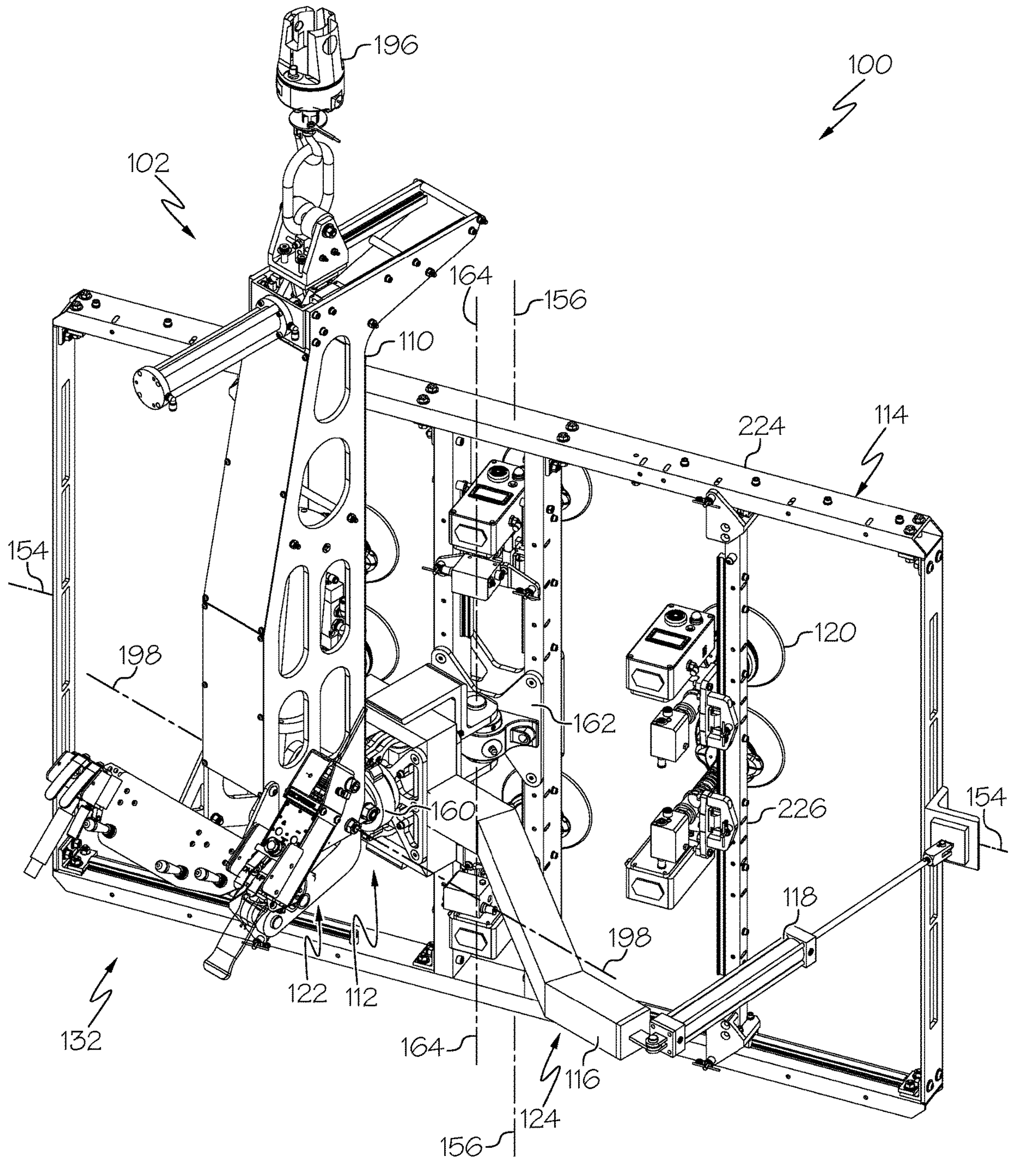
FIG. 7 is schematic, perspective view of an example of the lift in the second orientation with the lift-frame rotated relative to the lift-arm.
Figure 8:
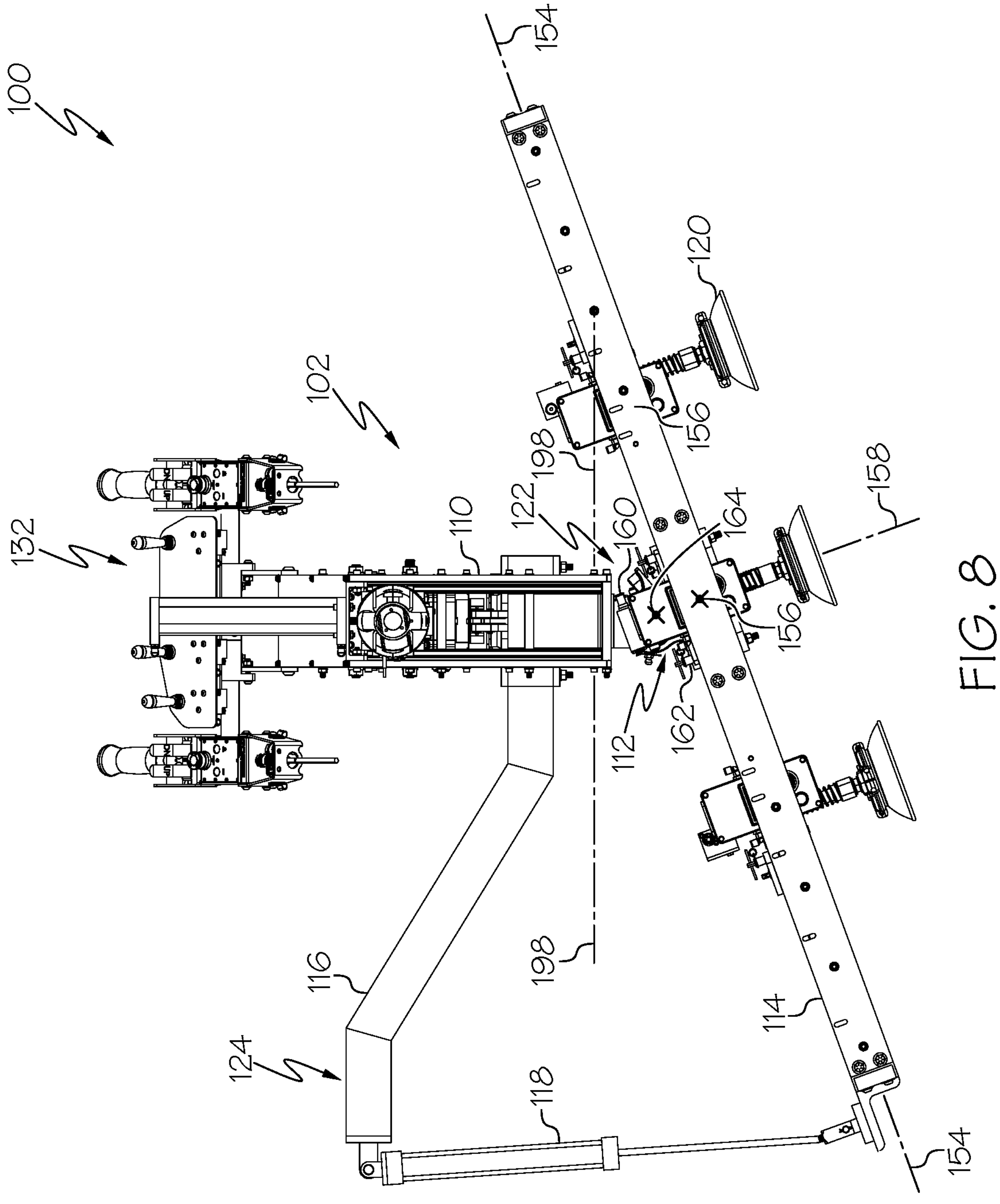
FIG. 8 is a schematic, plan view of an example of the lift of FIG. 7.
Figure 9:
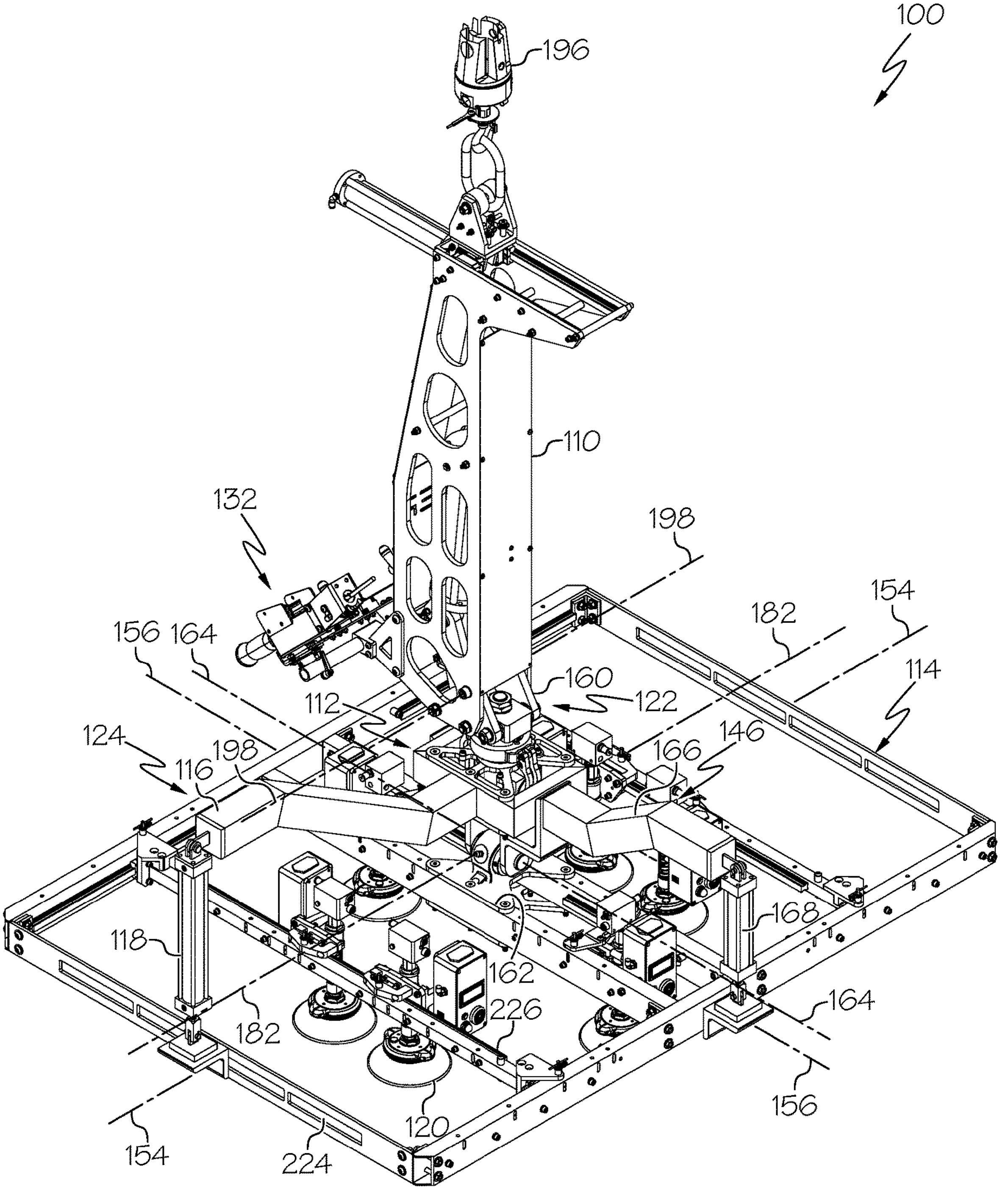
FIG. 9 is a schematic, perspective view of an example of the lift in the first orientation.
Figure 10:
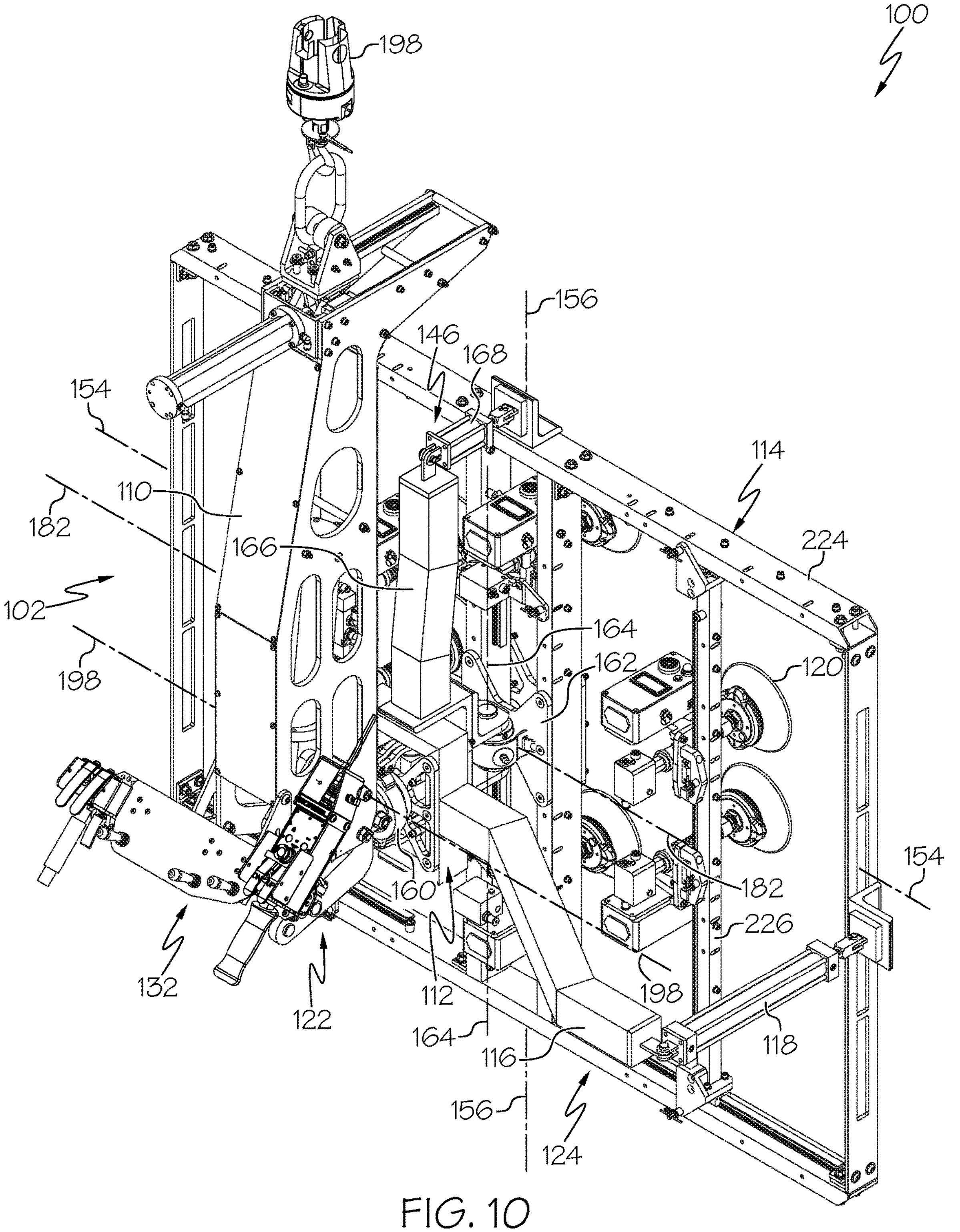
FIG. 10 is a schematic, perspective view of an example of the lift in the second orientation.

Referring generally to FIGS. 1-11, by way of examples, the present disclosure is directed to a system 100 (also referred to herein as a lifting system or material handling system) for handling or otherwise manipulating a workpiece 104. The present disclosure is also directed to a lift 102 of the system 100. The system 100 and the lift 102 facilitate improvements in the degrees of freedom available for manipulation and control compared to conventional material handling systems.

For the purpose of the present disclosure, the workpiece 104 (FIG. 11) refers to any object, article, structure, component, part, piece of raw material, or partially finished piece or material that is being handled, manipulated, picked up, moved, shaped, worked on, or assembled using the system

100 and/or the lift 102. The workpiece 104 can have any suitable dimensions and/or geometries.

The present disclosure recognizes that conventional material handling systems and lifts provide one axis of rotation of 90 degrees between horizontal and vertical. Some material handling systems or lifts provide a second axis of rotation of 180 degrees within the horizontal or vertical plane. However, these conventional material handling systems and/or lifts are not capable of complex and precise spatial manipulations, such as those required for positioning of aircraft components for installation.

The system 100 and the lift 102 disclosed herein improve upon existing implementations and methods for handling or otherwise manipulating the workpiece 104 in three-dimensional space. In one or more examples, the lift system 100 and/or the lift 102 enable the workpiece 104 to be picked up in a first orientation (e.g., horizontal, vertical, or between horizontal and vertical). The lift system 100 and/or the lift 102 enable workpiece 104 to be rotated, for example, up to or beyond approximately 90 degrees, to a second orientation (e.g., vertical, horizontal, or between horizontal and vertical). With the workpiece 104 in the first orientation, the second orientation, or at any orientation between the first and second orientations, the lift system 100 and/or the lift 102 enable the workpiece 104 to be manipulated to adjust and control its angular orientation relative to its oriented plane.

Referring now to FIGS. 1-11, the following are examples of the lift 102, according to the present disclosure. The lift 102 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIGS. 1-11, in one or more examples, the lift 102 includes a lift-arm 110 a joint 112, a lift-frame 114, a gripper 120, a lift-drive assembly 122, and a roll-drive assembly 124. The joint 112 is coupled to the lift-arm 110. The lift-frame 114 is coupled to the joint 112. The gripper 120 is coupled to the lift-frame 114. The lift-drive assembly 122 is configured or operates to revolve the lift-frame 114 about a lift-axis 198 and relative to the lift-arm 110. The lift-axis 198 is parallel to a pitch-axis 154 of the lift-frame 114. The roll-drive assembly 124 is configured or operates to revolve the lift-frame 114 about a joint-axis 164 and relative to the lift-arm 110. The joint-axis 164 is parallel to a roll-axis 156 of the lift-frame 114.

Generally, as used herein, the lift-axis 198 and the joint-axis 164 refer to axes of motion of the lift-frame 114 relative to the lift-arm 110. Similarly, in applicable examples, a second lift-axis 200 (when present) and a second joint-axis 182 (when present) refer to other axes of motion of the lift-frame 114 relative to the lift-arm 110. Selective and/or controlled movement of the lift-frame 114 relative to the lift-arm 110 about one or more of the axes of motion in turn manipulates the workpiece 104, coupled to the lift-frame 114, in three-dimensional space.

In one or more examples, the lift-arm 110 serves as the main support element or body for the lift-frame 114. The lift-arm 110 can have any suitable size and/or geometry depending on, for example, the size and/or geometry of the lift-frame 114, the application of the lift 102, and/or the workpiece 104 being manipulated by the lift 102. The lift-frame 114 is coupled to the joint 112, opposite the lift-arm 110. The lift-frame 114 serves as the main support element or body for the gripper 120. The lift-frame 114 can have any suitable size and/or geometry depending on, for example, the number of the grippers 120, the application of the lift 102, and/or the size (e.g., weight, geometry, etc.) of the workpiece 104 being manipulated by the lift 102. The lift 102 can have any number of grippers 120. The number of the grippers 120 can depend on, for example, the application of the lift 102, and/or the size of the workpiece 104 being manipulated by the lift 102. The lift-drive assembly 122 provides (e.g., gross) control over the angular orientation of the lift-frame 114 and, thus, the workpiece 104 about the lift-axis 198. The roll-drive assembly 124 provides (e.g., fine or precise) control over the angular orientation of the lift-frame 114 and, thus, the workpiece 104 about the joint-axis 164.

In one or more examples, the lift-frame 114 includes a 3-axis (e.g., X-, Y-, and Z-axis) coordinate system 152. The coordinate system 152 is fixed relative to the lift-frame 114. In these examples, the coordinate system 152 is used to define the three-dimensional motion of the lift-frame 114. For the purposes of the present disclosure, the axes of the coordinate system 152 pass through the body of the lift-frame 114, intersect one another at right angles, and are referred to herein by the three-dimensional motion that occurs when the lift-frame 114 rotates about a corresponding axis or an axis that is parallel to or coincident with the axis of the coordinate system 152.

In one or more examples, the coordinate system 152 includes the pitch-axis 154, the roll-axis 156, and a yaw-axis 158. The pitch-axis 154 (e.g., a first axis or Y-axis) extends through the lift-frame 114 (e.g., side-to-side). Throughout the present disclosure, rotation of the lift-frame 114 about the pitch-axis 154 or about an axis that is parallel to or coincident with the pitch-axis 154 (e.g., lift-axis 198 and/or second joint-axis 182) is referred to herein as pitch. The roll-axis 156 (e.g., a second axis of X-axis) extends through the lift-frame 114 (e.g., front-to-back). Throughout the present disclosure, rotation of the lift-frame 114 about the roll-axis 156 or about an axis that is parallel to or coincident with the roll-axis 156 (e.g., joint-axis 164) is referred to herein as roll. The yaw-axis 158 (e.g., a third axis or Z-axis) extends through the lift-frame 114. Throughout the present disclosure, rotation of the lift-frame 114 about the yaw-axis 158 or about an axis that is parallel to or coincident with the yaw-axis 158 (e.g., second lift-axis 200) is referred to herein as yaw.

Referring to FIGS. 1-11, in one or more examples, the roll-drive assembly 124 includes a roll-arm 116 and a roll-drive 118. The roll-arm 116 is coupled to the joint 112 such that the roll-arm 116 revolves (e.g., is revolvable) about the lift-axis 198. As such, the roll-arm 116 revolves about the lift-axis 198 with the lift-frame 114. The roll-drive 118 is coupled to the roll-arm 116 and to the lift-frame 114. The roll-drive 118 is configured or operates to revolve the lift-frame 114 about the joint-axis 164 and relative to the roll-arm 116.

Figure 11:
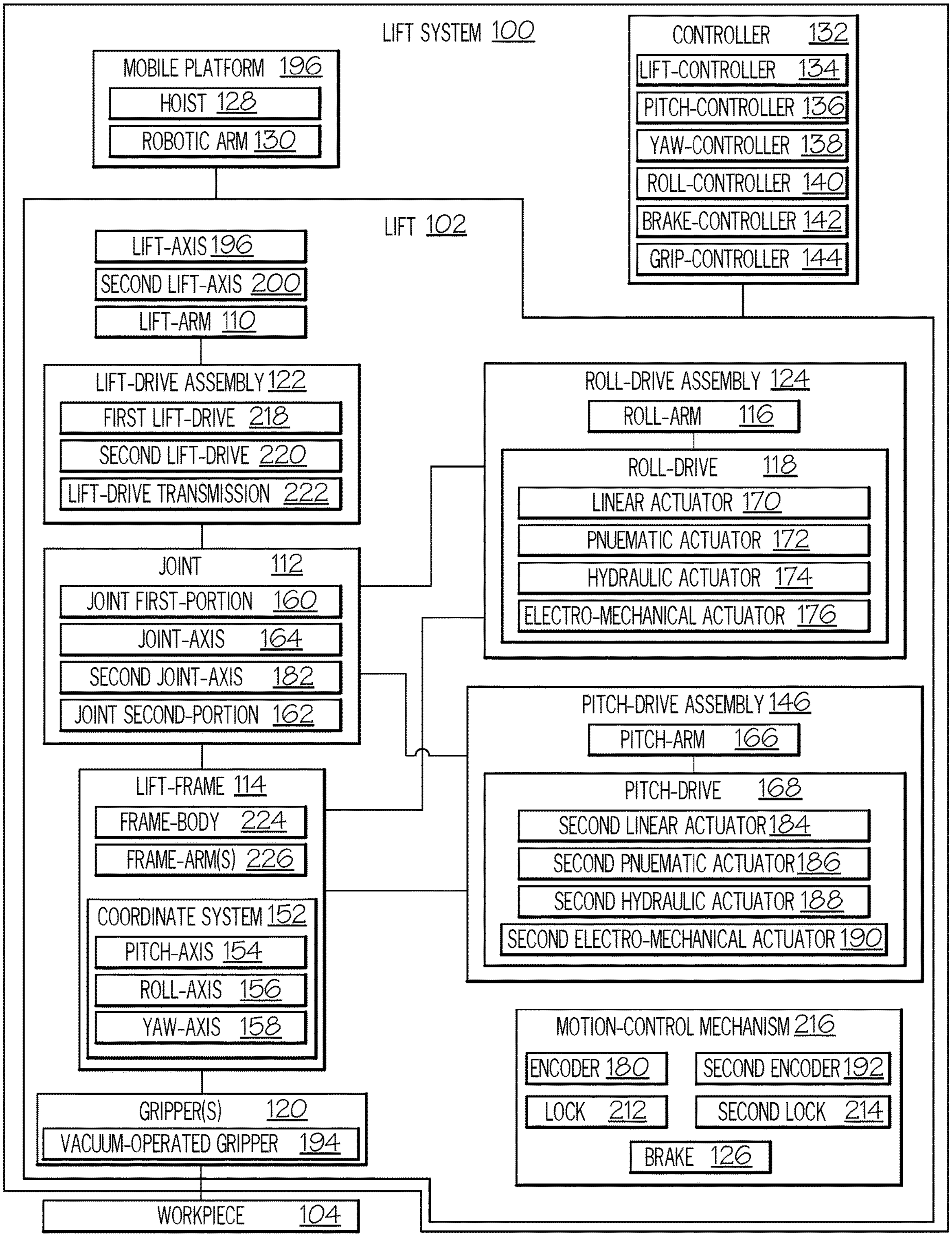
FIG. 11 is a schematic, block diagram of an example of the system.

Referring to FIG. 11, the roll-drive 118 can include any suitable machine, mechanism, or device that generates or transmits mechanical energy sufficient to drive motion of the lift-frame 114 relative to the lift-arm 110 about the joint-axis 164. In one or more examples, the roll-drive 118 includes or takes the form of a linear actuator 170. In one or more examples, the roll-drive 118 includes or takes the form of a pneumatic actuator 172 (e.g., a pneumatic cylinder). In one or more examples, the roll-drive 118 includes or takes the form of a hydraulic actuator 174 (e.g., a hydraulic cylinder). In one or more examples, the roll-drive 118 includes or takes the form of an electro-mechanical actuator 176 (e.g., a motor and a rod, a lead screw, a ball screw, a rack and pinion, a belt, etc.). In other examples, the roll-drive 118 includes or takes the form of a different type of drive mechanism, such as a motor or a rotary actuator. In these examples, the roll-drive assembly 124 also includes a transmission that converts rotational motion of the roll-drive 118 into linear motion or translational motion.

Referring to FIG. 11, in one or more examples, the lift-drive assembly 122 includes a first lift-drive 218. The first lift-drive 218 can include any suitable machine, mechanism, or device that generates or transmits mechanical energy sufficient to drive motion of the lift-frame 114 relative to the lift-arm 110 about the lift-axis 198. In one or more examples, the first lift-drive 218 includes or takes the form of a linear actuator, such as a pneumatic actuator, a hydraulic actuator, or an electro-mechanical actuator, a motor, a rotary actuator, or a different type of drive mechanism. In one or more examples, the lift-drive assembly 122 also includes a lift-drive transmission 222 that converts or transfers motion of the first lift-drive 218 into motion of the lift-frame 114 relative to the lift-arm 110.

Referring to FIG. 11, in one or more examples, the lift 102 includes a motion-control mechanism 216. The motion-control mechanism 216 is configured or operates to determine, track, and/or selectively enable or inhibit motion of the lift-frame 114 relative to the lift-arm 110 about one or more axes of motion.

Referring to FIG. 11, in one or more examples, the lift 102 includes an encoder 180. The encoder 180 is configured or operates to (e.g., automatically) determine and/or track a rotational orientation of the lift-frame 114. In an example, the encoder 180 determines and/or tracks the roll of the lift-frame 114, for example, the rotational orientation of the lift-frame 114 relative to the lift-frame 114 about the joint-axis 164 (e.g., axis of motion parallel to the roll-axis 156). In an example, the encoder 180 determines and/or tracks the pitch of the lift-frame 114, for example, the rotational orientation of the lift-frame 114 relative to the lift-arm 110 and about the lift-axis 198 (e.g., axis of motion parallel to the pitch-axis 154). In one or more examples, the encoder 180 is integrated with or forms a part of the motion-control mechanism 216.

Referring to FIG. 11, in one or more examples, the lift 102 includes a lock 212. The lock 212 is configured or operates to (e.g., automatically or manually) secure or otherwise fix the rotational orientation of the lift-frame 114. In one or more examples, the lock 212 includes or takes the form of a pin, a detent, a fastener, a clamp, a bearing, or the like. In one or more examples, the lock 212 includes or takes the form of a brake that is configured to be selectively actuated to inhibit rotational motion of the lift-frame 114. In an example, the lock 212 fixes the roll of the lift-frame 114, for example, the rotational orientation of the lift-frame 114 relative to the lift-frame 114 about the joint-axis 164 (e.g., axis of motion parallel to the roll-axis 156). In an example, the lock 212 fixes the pitch of the lift-frame 114, for example, the rotational orientation of the lift-frame 114 relative to the lift-frame 114 about the lift-axis 198 (e.g., axis of motion parallel to the pitch-axis 154). In one or more examples, the lock 212 is integrated with or forms a part of the motion-control mechanism 216.

Referring to FIG. 11, the joint 112 can include any suitable configuration or construction that enables movement of the lift-frame 114 relative to the lift-arm 110 about at least one axis. In one or more examples, the joint 112 has one axis of rotation or one degree of freedom (1 DOF), such as, a hinge joint or other revolute joint. In one or more examples, the joint 112 has two axes of rotation or two degrees of freedom (2 DOF), such as a universal joint. In one or more examples, the joint 112 has three axes of rotation or three degrees of freedom (3 DOF), such as a spherical joint or ball joint.

Referring to FIGS. 1-11, in one or more examples, the joint 112 includes a joint first-portion 160 and a joint second-portion 162. The joint first-portion 160 is coupled to the lift-arm 110. The joint second-portion 162 is coupled to the joint first-portion 160 and to the lift-frame 114. The lift-drive assembly 122 is coupled to the lift-arm 110 and to the joint first-portion 160. The roll-arm 116 is coupled to the joint first-portion 160. In one or more examples, the joint second-portion 162 is rotatable about the joint-axis 164 and relative to the joint first-portion 160.

In one or more examples, the joint second-portion 162 rotates (e.g., is rotatable) relative to the joint first-portion 160 about the joint-axis 164, which is parallel to the roll-axis 156 of the lift-frame 114. In one or more examples, the joint second-portion 162 also rotates relative to the joint first-portion 160 about the second joint-axis 182. In one or more examples, the joint first-portion 160 and the second joint-axis 182 intersect one another and are perpendicular to each other.

Referring to FIGS. 1-11, in one or more examples, the lift 102 includes a pitch-drive assembly 146. The pitch-drive assembly 146 is configured or operates to revolve the lift-frame 114 about the second joint-axis 182 and relative to the lift-arm 110. The second joint-axis 182 is parallel to the pitch-axis 154 of the lift-frame 114. The pitch-drive assembly 146 provides (e.g., fine or precise) control over the angular orientation of the lift-frame 114 and, thus, the workpiece 104 about the second joint-axis 182. Controlling the orientation of the lift-frame 114 about the second joint-axis 182 using the pitch-drive assembly 146 provides more precise pitch control compared to rotation using the lift-drive assembly 122.

Referring to FIGS. 1-11, in one or more examples, the pitch-drive assembly 146 includes a pitch-arm 166 and a pitch-drive 168. The pitch-arm 166 is coupled to the joint 112 such that the pitch-arm 166 rotates (e.g., is rotatable) about the lift-axis 198. As such, the pitch-arm 166 rotates with the lift-frame 114. The pitch-drive 168 is coupled to the pitch-arm 166 and to the lift-frame 114. The pitch-drive 168 is configured or operates to revolve the lift-frame 114 about the second joint-axis 182 and relative to the pitch-arm 166.

Referring to FIGS. 1-8 and 11, in one or more examples, the joint 112 includes the joint first-portion 160 and the joint second-portion 162. The joint first-portion 160 is coupled to the lift-arm 110. The joint second-portion 162 is coupled to the joint first-portion 160 and to the lift-frame 114. The lift-drive assembly 122 is coupled to the lift-arm 110 and to the joint first-portion 160. The roll-arm 116 is coupled to the joint first-portion 160. The pitch-arm 166 is coupled to the joint first-portion 160. In one or more examples, the joint second-portion 162 is rotatable about the joint-axis 164 and relative to the joint first-portion 160. In one or more examples, the joint second-portion 162 is rotatable about the second joint-axis 182 and relative to the joint first-portion 160.

Referring to FIGS. 11, the pitch-drive 168 can include any suitable machine, mechanism, or device that generates or transmits mechanical energy sufficient to drive motion. In one or more examples, the pitch-drive 168 includes or takes the form of a second linear actuator 184. In one or more examples, the pitch-drive 168 includes or takes the form of a second pneumatic actuator 186. In one or more examples, the pitch-drive 168 includes or takes the form of a second hydraulic actuator 188. In one or more examples, the pitch-drive 168 includes or takes the form of a second electro-mechanical actuator 190. In other examples, the pitch-drive 168 includes or takes the form of a different type of drive mechanism, such as a motor or a rotary actuator. In these examples, the pitch-drive assembly 146 also includes a transmission that converts rotational motion of the pitch-drive 168 into linear motion or translational motion.

Referring to FIG. 11, in one or more examples, the lift 102 includes a second encoder 192. The second encoder 192 is configured or operates to (e.g., automatically) determine and/or track a rotational orientation of the lift-frame 114. In an example, the encoder 180 determines and/or tracks the pitch of the lift-frame 114, for example, the rotational orientation of the lift-frame 114 relative to the lift-frame 114 about the second joint-axis 182 (e.g., axis of motion parallel to the pitch-axis 154). In one or more examples, the second encoder 192 is integrated with or forms a part of the motion-control mechanism 216.

Referring to FIG. 11, in one or more examples, the lift 102 includes a second lock 214. The second lock 214 is configured or operates to (e.g., automatically or manually) secure or otherwise fix the rotational orientation of the lift-frame 114. In one or more examples, the second lock 214 includes or takes the form of a pin, a detent, a fastener, a clamp, a bearing, or the like. In one or more examples, the second lock 214 includes or takes the form a brake that is configured to be selectively actuated to inhibit rotational motion of the lift-frame 114. In an example, the second lock 214 fixes the pitch of the lift-frame 114, for example, the rotational orientation of the lift-frame 114 relative to the lift-frame 114 about the second joint-axis 182 (e.g., axis of motion parallel to the pitch-axis 154). In one or more examples, the second lock 214 is integrated with or forms a part of the motion-control mechanism 216. In one or more examples, the lock 212 and the second lock 214 are integrated into a single orientation-locking mechanism that fixes the rotational orientation of the lift-frame 114 about more than one axis. In one or more examples, the lock 212 and the second lock 214 are discrete orientation-locking mechanisms, each of which fixes the rotational orientation of the lift-frame 114 about a corresponding axis.

Referring to FIGS. 1-11, in one or more examples, the lift-frame 114 is rotatable relative to the lift-arm 110 about a second lift-axis 200. In one or more examples, the second lift-axis 200 is perpendicular to the lift-axis 198. In one or more examples, the second lift-axis 200 is parallel to the yaw-axis 158 of the lift-frame 114.

Referring to FIGS. 11, in one or more examples, the lift 102 includes a brake 126. In these examples, the brake 126 is configured or operates to selectively inhibit rotation of the lift-frame 114 relative to the lift-arm 110 about the second lift-axis 200.

Referring to FIGS. 1-11, in one or more examples, the lift-drive assembly 122 is configured or operates to rotate the lift-frame 114 relative to the lift-arm 110 about the second lift-axis 200.

Referring to FIG. 11, in one or more examples, the lift-drive assembly 122 includes a second lift-drive 220. The second lift-drive 220 can include any suitable machine, mechanism, or device that generates or transmits mechanical energy sufficient to drive motion of the lift-frame 114 relative to the lift-arm 110 about the second lift-axis 200. In one or more examples, the first lift-drive 218 includes or takes the form of a linear actuator, such as a pneumatic actuator, a hydraulic actuator, or an electro-mechanical actuator, a motor, a rotary actuator, or a different type of drive mechanism. In one or more examples, the lift-drive transmission 222 converts or transfers motion of the second lift-drive 220 into motion of the lift-frame 114 relative to the lift-arm 110.

Referring to FIGS. 1-11, in one or more examples, the gripper 120 is movable relative to the lift-frame 114. In one or more examples, the lift-frame 114 includes a frame-body 224 and a frame-arm 226. In one or more examples, the lift-frame 114 includes any number of (e.g., one or more) frame-arms 226. In one or more examples, the frame-body 224 forms a perimeter boundary of the lift-frame 114 and serves as the main support for the frame-arm 226. Each one of the frame-arms 226 is coupled to the frame-body 224. At least one of the grippers 120 is coupled to the frame-arm 226 (e.g., each one of the frame-arms 226). The frame-arm 226 serves as the main support for the gripper 120.

In one or more examples, the gripper 120 is movable (e.g., translates) along the frame-arm 226. In one or more examples, a location of the gripper 120 along the frame-arm 226 can be adjusted, selected, and secured manually. In these examples, the gripper 120 includes a mechanism that enables the gripper 120 to slide along the frame-arm 226 and lock to the frame-arm 226 at various locations. In one or more examples, the location of the gripper 120 along the frame-arm 226 can be adjusted, selected, and secured automatically. In these examples, the gripper 120 includes a drive mechanism (e.g., motor and transmission) that drives motion of the gripper 120 to along the frame-arm 226 and fixes the gripper 120 at various locations relative to the to the frame-arm 226.

In one or more examples, the frame-arm 226 is movable (e.g., translates) along the frame-body 224. In one or more examples, a location of the frame-arm 226 along the frame-body 224 can be adjusted, selected, and secured manually. In these examples, the frame-arm 226 includes a mechanism that enables the frame-arm 226 to slide along the frame-body 224 and lock to the frame-body 224 at various locations. In one or more examples, the location of the frame-arm 226 along the frame-body 224 can be adjusted, selected, and secured automatically. In these examples, the frame-arm 226 includes a drive mechanism (e.g., motor and transmission) that drives motion of the frame-arm 226 along the frame-body 224 and fixes the frame-arm 226 at various locations relative to the to the frame-body 224.

Referring to FIG. 11, in one or more examples, the gripper 120 includes or takes the form of a vacuum-operated gripper 194. In one or more examples, the vacuum-operated gripper 194 includes or takes the form of a vacuum cup. In these examples, the vacuum-operated gripper 194 also includes a vacuum source that is coupled to and in fluid communication with the vacuum cup.

In other examples, the gripper 120 includes or takes the form of other suitable gripping devices, such as, but not limited to, magnets, articulating grippers or graspers, clamps, electrostatic grippers, and the like. The configuration or operating principles of the gripper 120 can depend on the type of the workpiece 104 being handled by the lift 102.

Referring now to FIGS. 1-11, the following are examples of the system 100, according to the present disclosure. The system 100 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIGS. 1-11, in one or more examples, the system 100 includes a mobile platform 196, the lift-arm 110, the joint 112, the lift-frame 114, the gripper 120, the lift-drive assembly 122, the roll-drive assembly 124, and a controller 132.

The mobile platform 196 moves the lift-arm 110 in three-dimensional space. The lift-arm 110 is coupled to the mobile platform 196. The joint 112 is coupled to the lift-arm 110. The lift-frame 114 is coupled to the joint 112, opposite the lift-arm 110. The gripper 120 is coupled to the lift-frame 114. The lift-drive assembly 122 revolves the lift-frame 114 about the lift-axis 198 and relative to the lift-arm 110. The lift-axis 198 is parallel to the pitch-axis 154 of the lift-frame 114. The roll-drive assembly 124 revolves the lift-frame 114 about the joint-axis 164 and relative to the lift-arm 110. The joint-axis 164 is parallel to a roll-axis 156 of the lift-frame 114. The controller 132 operates the mobile platform 196, the lift-drive assembly 122, and the roll-drive assembly 124.

Referring to FIG. 11, in one or more examples, the mobile platform 196 includes or takes the form of a hoist 128 or other overhead gantry or lifting mechanism. In one or more examples, the mobile platform 196 includes or takes the form of a robotic arm 130 or other computer controlled robotic manipulator. In one or more examples, the mobile platform 196 enables free (e.g., manually motivated) movement of the lift 102 in one or more horizontal directions. In one or more examples, the mobile platform 196 enables controlled (e.g., drive motivated) movement of the lift 102 in one or more horizontal and/or vertical directions.

Referring to FIGS. 1-11, in one or more examples of the lift system 100, the roll-drive assembly 124 includes the roll-arm 116 and the roll-drive 118. The roll-arm 116 is coupled to the joint 112 such that the roll-arm 116 revolves about the lift-axis 198 with the lift-frame 114. The roll-drive 118 is coupled to the roll-arm 116 and to the lift-frame 114. The roll-drive 118 revolves the lift-frame 114 about the joint-axis 164 and relative to the roll-arm 116.

Referring to FIGS. 1-11, in one or more examples, the lift system 100 includes the pitch-drive assembly 146 that revolves the lift-frame 114 about the second joint-axis 182 and relative to the lift-arm 110. The second joint-axis 182 is parallel to the pitch-axis 154 of the lift-frame 114.

Referring to FIGS. 1-11, in one or more examples of the lift system 100, the pitch-drive assembly 146 includes the pitch-arm 166 and the pitch-drive 168. The pitch-arm 166 is coupled to the joint 112 such that the pitch-arm 166 rotates about the lift-axis 198 with the lift-frame 114. The pitch-drive 168 is coupled to the pitch-arm 166 and to the lift-frame 114. The pitch-drive 168 revolves the lift-frame 114 about the second joint-axis 182 and relative to the pitch-arm 166.

In various other examples, the lift system 100 includes one or more or any combination of elements, features, and/or components of the lift 102, as described herein above and illustrated in FIGS. 1-11.

Referring to FIG. 11, in one or more examples, the controller 132 includes any suitable manually controlled or programmable control unit or computing device that generates and transfers command signals to the operational components of the lift system 100 and/or the lift 102. In one or more examples, the controller 132 includes a lift-controller 134 that is configured or operates to generate and transfer command signals to the lift-drive assembly 122 and/or the mobile platform 196. In one or more examples, the controller 132 includes a pitch-controller 136 that is configured or operates to generate and transfer command signals to the lift-drive assembly 122 and/or the pitch-drive assembly 146 to control the pitch of the lift-frame 114. In one or more examples, the controller 132 includes a roll-controller 140 that is configured or operates to generate and transfer command signals to the roll-drive assembly 124 to control the roll of the lift-frame 114. In one or more examples, the controller 132 includes a yaw-controller 138 that is configured or operates to generate and transfer command signals to the lift-drive assembly 122 to control the yaw of the lift-frame 114. In one or more examples, the controller 132 includes a brake-controller 142 that is configured or operates to generate and transfer command signals to the brake 126 for actuating the brake 126. In one or more examples, the controller 132 includes a grip-controller 144 that is configured or operates to generate and transfer command signals to the gripper 120 for controlling movement of and energizing the gripper 120.

As illustrated in FIGS. 1-10, in one particular implementation of the lift system 100, the lift 102 is a vacuum-operated lift or vacuum-operated hoist that assists with handling the workpiece 104. The workpiece 104 is moved in a horizontal and/or vertical direction using the lift 102. In these examples, the lift 102 includes a vacuum-hoist frame (e.g., lift-frame 114) having one or more vacuum-operated grippers (e.g., grippers 120). The lift 102 includes a robotic apparatus (e.g., mobile platform 196 and lift-arm 110) that is coupled to the vacuum-hoist frame. The lift 102 includes a robotic end effector (e.g., lift-drive assembly 122) that is pivotally mounted on the robotic apparatus to pivot about a horizontal axis to enable pivoting the vacuum-hoist frame between horizontal and vertical orientations. The robotic end effector also rotates and/or spins about a centerline axis for planar rotation of the vacuum-hoist frame. The lift 102 includes an interconnecting manipulator (e.g., joint 112) coupled between the robotic end effector and the vacuum-hoist frame. The interconnecting manipulator includes a hinge pin pivotally coupling the vacuum-hoist frame to the interconnecting manipulator. The lift 102 includes an elongate arm (e.g., roll-arm 116) having a linear actuator (e.g., roll-drive 118) coupled to a side of the vacuum-hoist frame, such that extension or retraction enables 6 degrees of freedom of motion of the vacuum-hoist frame.

Figure 12:
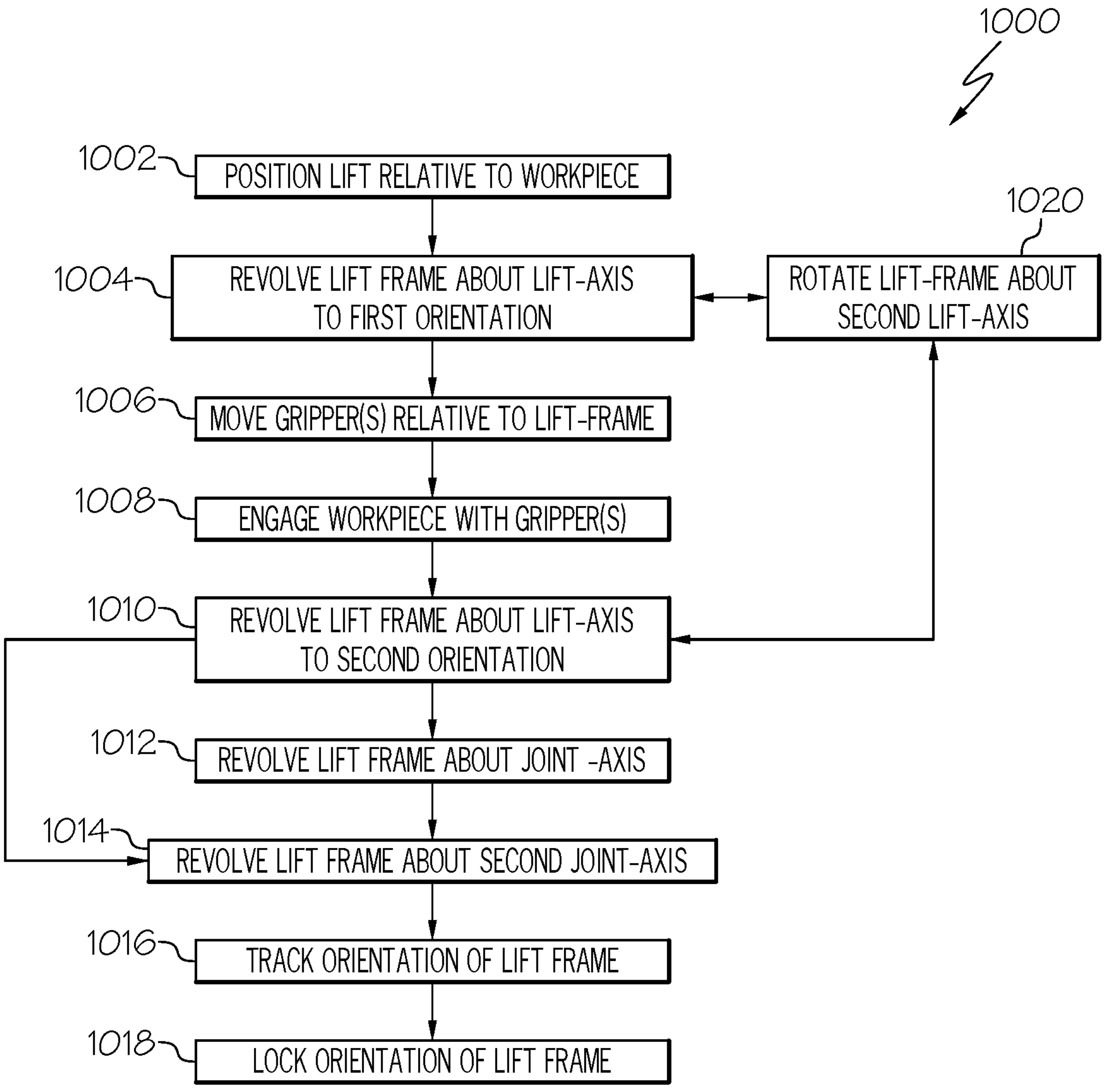
FIG. 12 is a flow diagram of an example of a method for handling a workpiece.

Referring generally to FIG. 12, by way of examples, the present disclosure is directed to a method 1000 for handling or otherwise manipulating the workpiece 104. The method 1000 facilitates improvements in the available degrees of freedom during material handling compared to conventional material handling methods.

Referring generally to FIGS. 1-11 and particularly to FIG. 12, the following are examples of the method 1000, according to the present disclosure. In one or more examples, the method 1000 is implemented using the lift 102 or the lift system 100 (FIG. 1-11). The method 1000 includes a number of elements, steps, and/or operations. Not all of the elements, steps, and/or operations described or illustrated in one example are required in that example. Some or all of the elements, steps, and/or operations described or illustrated in one example can be combined with other examples in various ways without the need to include other elements, steps, and/or operations described in those other examples, even though such combination or combinations are not explicitly described or illustrated by example herein.

In one or more examples, according to the method 1000, the lift 102 includes the lift-arm 110, the lift-frame 114, the gripper 120, the lift-drive assembly 122, and the roll-drive assembly 124. The lift-frame 114 is coupled to the lift-arm 110 by the joint 112. The gripper 120 is coupled to the lift-frame 114. The lift-drive assembly 122 is coupled to the lift-arm 110 and to the joint 112. The roll-drive assembly 124 is coupled to the lift-frame 114 and to the joint 112. In one or more examples, according to the method 1000, the lift 102 includes the pitch-drive assembly 146 that is coupled to the lift-frame 114 and to the joint 112.

In one or more examples, the method 1000 includes a step of (block 1002) positioning the lift 102 relative to the workpiece 104. In one or more examples, the positioning step (e.g., block 1002) is performed using the mobile platform 196. The positioning step (e.g., block 1002) can be performed manually, automatically (e.g., using manually-controlled or computer-controlled drive mechanisms), or a combination thereof.

In one or more examples, the method 1000 includes a step of (block 1004) revolving a lift-frame 114 of the lift 102 about the lift-axis 198 to a first orientation relative to the lift-arm 110 of the lift 102. The lift-axis 198 is parallel to the pitch-axis 154 of the lift-frame 114. In one or more examples, according to the method 1000, the step of (block 1004) revolving the lift-frame 114 to the first orientation about the lift-axis 198 is performed using the lift-drive assembly 122.

In one or more examples, the method 1000 includes as step of (block 1006) moving the gripper 120 relative to the lift-frame 114.

In one or more examples, with the lift-frame 114 in the first orientation, the method 1000 includes a step of (block 1008) engaging the workpiece 104 with the gripper 120 that is coupled to the lift-frame 114.

In one or more examples, with the gripper 120 engaged to the workpiece 104, the method 1000 includes a step of (block 1010) revolving the lift-frame 114 about the lift-axis 198 to a second orientation relative to the lift-arm 110. In one or more examples, according to the method 1000, the step of (block 1010) revolving the lift-frame 114 to the second orientation about the lift-axis 198 is performed using the lift-drive assembly 122.

In one or more examples, the method 1000 includes a step of (block 1012) revolving the lift-frame 114 about the joint-axis 164 relative to the lift-arm 110. The joint-axis 164 is parallel to the roll-axis 156 of the lift-frame 114. In one or more examples, according to the method 1000, the step of (block 1012) revolving the lift-frame 114 about the joint-axis 164 is performed using the roll-drive assembly 124.

In one or more examples, according to the method 1000, the first orientation is horizontal and the second orientation is vertical. In one or more examples, according to the method 1000, the first orientation is vertical and the second orientation is horizontal. In one or more examples, according to the method 1000, the first orientation is one of horizontal or vertical and the second orientation is between horizontal and vertical.

In one or more examples, according to the method 1000, the step of (block 1012) revolving the lift-frame 114 relative to the lift-arm 110 about the joint-axis 164 is performed with the lift-frame 114 in the first orientation. In one or more examples, according to the method 1000, the step of (block 1012) revolving the lift-frame 114 relative to the lift-arm 110 about the joint-axis 164 is performed with the lift-frame 114 in the second orientation.

In one or more examples, the method 1000 includes a step of (block 1016) tracking an orientation of the lift-frame 114 about the joint-axis 164. In one or more examples, the tracking step (e.g., block 1016) includes a step of tracking an orientation of the lift-frame 114 about the joint-axis 164. In one or more examples, the tracking step (e.g., block 1016) includes a step of tracking an orientation of the lift-frame 114 about the lift-axis 198. In one or more examples, the tracking step (e.g., block 1016) is performed using the encoder 180.

In one or more examples, the method 1000 includes a step of (block 1018) locking an orientation of the lift-frame 114. In one or more examples, the locking step (e.g., block 1018) includes a step of locking an orientation of the lift-frame 114 about the joint-axis 164. In one or more examples, the locking step (e.g., block 1018) includes a step of locking an orientation of the lift-frame 114 about the lift-axis 198. In one or more examples, the locking step (e.g., block 1018) is performed using the lock 212.

In one or more examples, the method 1000 includes a step of (block 1014) revolving the lift-frame 114 about the second joint-axis 182 relative to the lift-arm 110. The second joint-axis 182 is perpendicular to the joint-axis 164 and/or parallel to the pitch-axis 154 of the lift-frame 114. In one or more examples, according to the method 1000, the step of (block 1014) revolving the lift-frame 114 about the second joint-axis 182 is performed using the pitch-drive assembly 146.

In one or more examples, according to the method 1000, the tracking step (e.g., block 1016) includes a step of tracking an orientation of the lift-frame 114 about the second joint-axis 182.

In one or more examples, the method 1000 includes as step of (block 1020) rotating the lift-frame 114 about the second lift-axis 200. The second lift-axis 200 is perpendicular to the lift-axis 198 or parallel to the yaw-axis 158 of the lift-frame 114. In one or more examples, according to the method 1000, the step of (block 1020) rotating the lift-frame 114 about the second lift-axis 200 is performed using the lift-drive assembly 122.

Figure 13:
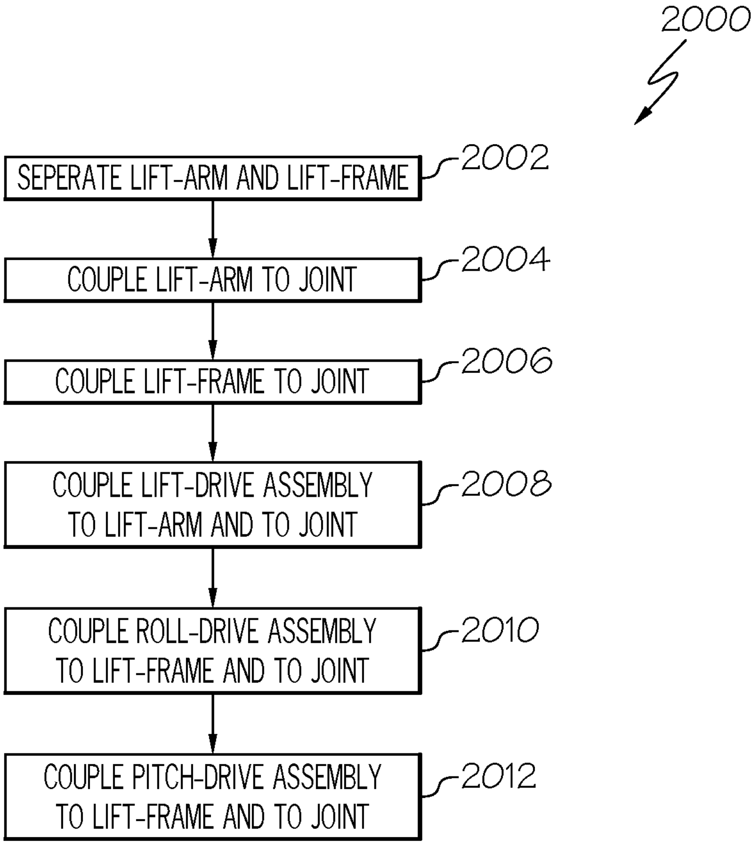
FIG. 13 is a flow diagram of an example of a method for modifying a lift.

Referring generally to FIGS. 1-11 and particularly to FIG. 13, the following are examples of the method 2000, according to the present disclosure. In one or more examples, the method 2000 is implemented to provide the lift 102 or the lift system 100 (FIG. 1-11). The method 2000 includes a number of elements, steps, and/or operations. Not all of the elements, steps, and/or operations described or illustrated in one example are required in that example. Some or all of the elements, steps, and/or operations described or illustrated in one example can be combined with other examples in various ways without the need to include other elements, steps, and/or operations described in those other examples, even though such combination or combinations are not explicitly described or illustrated by example herein.

Generally, the method 2000 begins by providing a precursor for the lift 102 or the system 100 (e.g., a commercially available lift or material handling system). The precursor lift or material handling system has a limited (e.g., sub-optimal) number of degrees of freedom available for manipulation and/or control. The method 2000 enables modification of the precursor lift to improve the available degrees of freedom.

In one or more examples, the method 2000 includes a step (block 2002) of separating the lift-arm 110 and the lift-frame 114 of the lift 102.

In one or more examples, the method 2000 includes a step (block 2004) coupling the lift-arm 110 to the joint 112.

In one or more examples, the method 2000 includes a step (block 2006) coupling the lift-frame 114 to the joint 112, opposite the lift-arm 110, such that the lift-frame 114 is revolvable relative to the lift-arm 110 about the lift-axis 198 that is parallel to a pitch-axis 154 of the lift-frame 114 and such that the lift-frame 114 is revolvable relative to the lift-arm 110 about the joint-axis 164 that is parallel to the roll-axis 156 of the lift-frame 114.

In one or more examples, the method 2000 includes a step (block 2008) coupling the lift-drive assembly 122 to the lift-arm 110 and to the joint 112 such that actuation of the lift-drive assembly 122 revolves the lift-frame 114 relative to the lift-arm 110 about the lift-axis 198.

In one or more examples, the method 2000 includes a step (block 2010) coupling the roll-drive assembly 124 to the lift-frame 114 and to the joint 112 such that actuation of the roll-drive assembly 124 revolves the lift-frame 114 relative to the lift-arm 110 about the joint-axis 164.

In one or more examples, according to the method 2000, the lift-arm 110 is coupled to the joint 112 (e.g., block 2006) such that the lift-frame 114 is revolvable relative to the lift-arm 110 about the second joint-axis 182 that is parallel to pitch-axis 154 of the lift-frame 114.

In one or more examples, the method 2000 includes a step of (block 2012) coupling the pitch-drive assembly 146 to the lift-frame 114 and to the joint 112 such that actuation of the pitch-drive assembly 146 revolves the lift-frame 114 relative to the lift-arm 110 about the second joint-axis 182.

Figure 14:
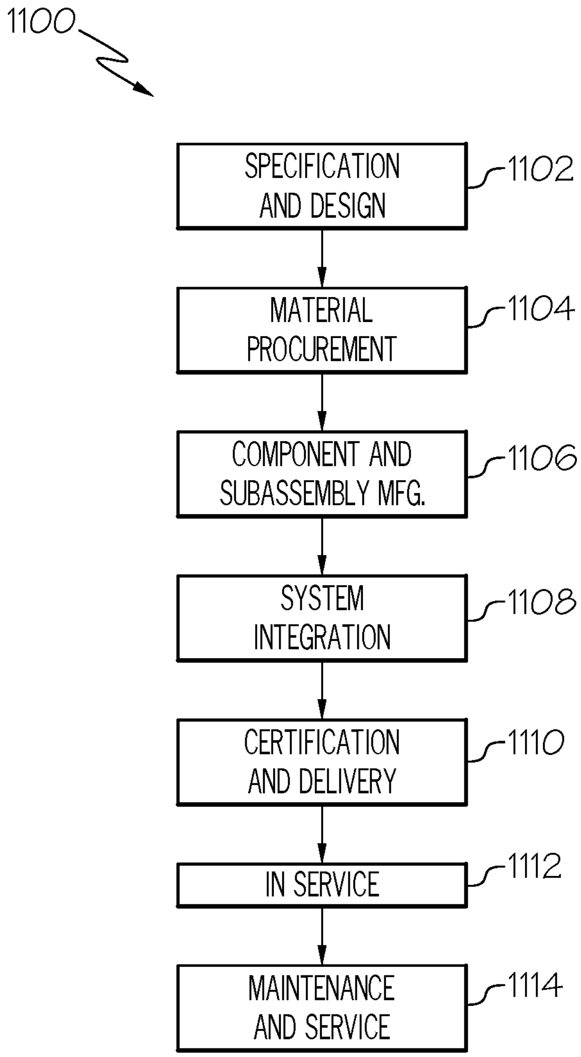
FIG. 14 is a flow diagram of an example of an aircraft manufacturing and service method.
Figure 15:
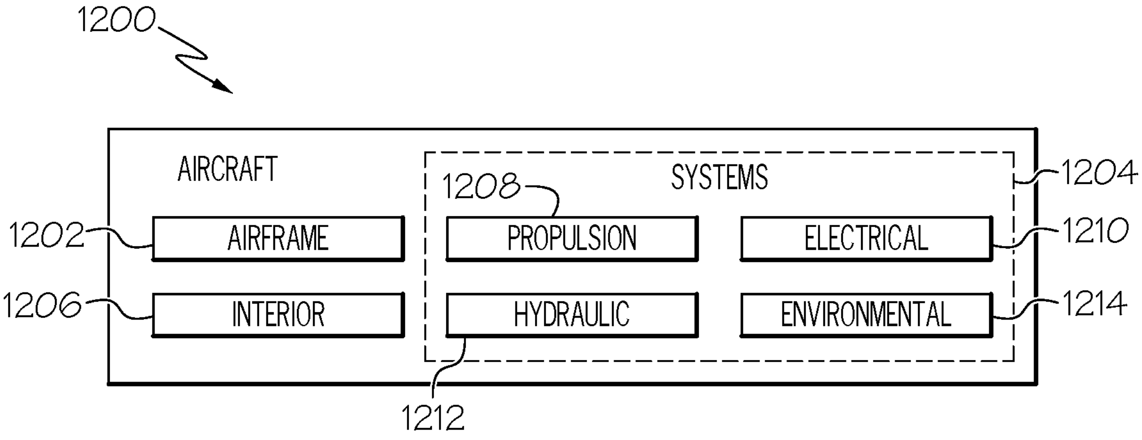
FIG. 15 is a schematic block diagram of an example of an aircraft.

Referring now to FIGS. 14 and 15, examples of the system 100 and the method 1000 described herein, may be related to, or used in the context of, the aircraft manufacturing and service method 1100, as shown in the flow diagram of FIG. 14 and the aircraft 1200, as schematically illustrated in FIG. 15. As an example, the aircraft 1200 and/or the aircraft production and service method 1100 may include or utilize components that are handled using the system 100, the lift 102, and/or according to the method 1000.

Referring to FIG. 15, which illustrates an example of the aircraft 1200. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. The aircraft 1200 can have any number of components that are handled before or during installation using the lift system 100, the lift 102, and/or according to the method 1000.

Referring to FIG. 14, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 14 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the system 100, the lift 102, and the method 1000 shown and described herein, may be employed during any one or more of the stages of the manufacturing and service method 1100 shown in the flow diagram illustrated by FIG. 14. In an example, components of the aircraft 1200 can be handled using the system 100, the lift 102, and/or according to the method 1000 during a portion of component and subassembly manufacturing (block 1106) and/or system integration (block 1108). Further, components of the aircraft 1200 can be handled using the system 100, the lift 102, and/or according to the method 1000 while the aircraft 1200 is in service (block 1112). Also, components of the aircraft 1200 can be handled using the system 100, the lift 102, and/or according to the method 1000 during system integration (block 1108) and certification and delivery (block 1110). Similarly, components of the aircraft 1200 can be handled using the system 100, the lift 102, and/or according to the method 1000 while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

As used herein, the terms "rotate," "rotating," "rotation," and similar terms refer to movement of a body around an axis and includes a condition in which the axis extends through a center of mass of the body (e.g., rotate) or a condition in which the axis extends through the body, but not through the center of mass of the body (e.g., gyrate or pivot). As used herein, the terms "revolve," "revolving," and similar terms refer to movement of a body around an axis and includes a condition in which the axis does not extend through the body (e.g., orbit).

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-11 and 15, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-11 and 15, referred to above, need be included in every example and not all elements, features, and/or components described herein are necessarily depicted in each illustrative example. Accordingly, some of the elements, features, and/or components described and illustrated in FIGS. 1-11 and 15 may be combined in various ways without the need to include other features described and illustrated in FIGS. 1-11 and 15, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-11 and 15, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-11 and 15, and such elements, features, and/or components may not be discussed in detail herein with reference to each of FIGS. 1-11 and 15. Similarly, all elements, features, and/or components may not be labeled in each of FIGS. 1-11 and 15, but reference numerals associated therewith may be utilized herein for consistency.

In FIGS. 12-14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 12-14 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the lift 102, the system 100, the method 1000, and the method 2000 have been shown and described, modifications may occur to those skilled in the art upon reading the specification. The present application includes such modifications and is limited only by the scope of the claims.

What is claimed is:

1. A lift, comprising
- a lift-arm;
- a joint that is coupled to the lift-arm;
- a lift-frame that is coupled to the joint, opposite the lift-arm;
- a gripper that is coupled to the lift-frame;
- a lift-drive assembly that revolves the lift-frame about a lift-axis that is parallel to a pitch-axis of the lift-frame and relative to the lift-arm;
- a roll-arm that is coupled to the joint such that the roll-arm revolves about the lift-axis with the lift-frame; and
- a roll-drive that is coupled to the roll-arm and to the lift-frame, wherein the roll-drive revolves the lift-frame relative to the roll-arm about a joint-axis that is parallel to a roll-axis of the lift-frame.

2. The lift of claim 1, wherein the roll-drive comprises a linear actuator.

3. The lift of claim 1, wherein the roll-drive comprises a pneumatic actuator.

4. The lift of claim 1, wherein the roll-drive comprises a hydraulic actuator.

5. The lift of claim 1, wherein the roll-drive comprises an electro-mechanical actuator.

6. The lift of claim 1, further comprising an encoder that determines a rotational orientation of the lift-frame about the roll-axis.

7. The lift of claim 1, wherein:
- the joint comprises:
  - a joint first-portion that is coupled to the lift-arm; and
  - a joint second-portion that is coupled to the joint first-portion and to the lift-frame;
- the lift-drive assembly is coupled to the lift-arm and to the joint first-portion; and
- the roll-arm is coupled to the joint first-portion.

8. The lift of claim 7, wherein the joint second-portion rotates relative to the joint first-portion about a joint-axis that is parallel to the roll-axis.

9. The lift of claim 1, further comprising a pitch-drive assembly that revolves the lift-frame about a second joint-axis that is parallel to the pitch-axis of the lift-frame and relative to the lift-arm.

10. A system for handling a workpiece, the system comprising:
- a mobile platform;
- a lift-arm that is coupled to the mobile platform, wherein the mobile platform moves the lift-arm;
- a joint that is coupled to the lift-arm;
- a lift-frame that is coupled to the joint, opposite the lift-arm;
- a gripper that is coupled to the lift-frame;
- a lift-drive assembly that revolves the lift-frame about a lift-axis that is parallel to a pitch-axis of the lift-frame and relative to the lift-arm;
- a roll-arm that is coupled to the joint such that the roll-arm revolves about the lift-axis with the lift-frame;
- a roll-drive that is coupled to the roll-arm and to the lift-frame, wherein the roll-drive revolves the lift-frame relative to the roll-arm about a joint-axis that is parallel to a roll-axis of the lift-frame; and
- a controller that operates the mobile platform, the lift-drive assembly, and the roll-drive.

11. The system of claim 10, further comprising a pitch-drive assembly that revolves the lift-frame about a second joint-axis that is parallel to the pitch-axis of the lift-frame and relative to the lift-arm.

12. A method for handling a workpiece using a lift, the method comprising steps of:
- revolving a lift-frame of the lift about a lift-axis to a first orientation relative to a lift-arm of the lift, coupled to the lift-frame at a joint, using a lift-drive assembly of the lift, coupled to the lift-arm and to the joint, wherein the lift-axis is parallel to a pitch-axis of the lift-frame;
- with the lift-frame in the first orientation, engaging the workpiece with a gripper of the lift, coupled to the lift-frame;
- with the gripper engaged to the workpiece, revolving the lift-frame about the lift-axis to a second orientation relative to the lift-arm using the lift-drive assembly; and
- revolving the lift-frame about a joint-axis relative to the lift-arm using a roll-drive of the lift, coupled to the lift-frame and to a roll-arm of the lift, coupled to the lift-arm at the joint, wherein the joint-axis is parallel to a roll-axis of the lift-frame.

13. The method of claim 12, wherein:
- the first orientation is horizontal; and
- the second orientation is vertical.

14. The method of claim 12, wherein:
- the first orientation is vertical; and
- the second orientation is horizontal.

15. The method of claim 12, wherein:
- the first orientation is one of horizontal or vertical; and
- the second orientation is between horizontal and vertical.

16. The method of claim 12, wherein the step of revolving the lift-frame relative to the lift-arm about the joint-axis is performed with the lift-frame in the first orientation.

17. The method of claim 12, wherein the step of revolving the lift-frame relative to the lift-arm about the joint-axis is performed with the lift-frame in the second orientation.

18. The method of claim 12, further comprising tracking an orientation of the lift-frame about the joint-axis.

19. The method of claim 12, further comprising positioning the lift relative to the workpiece.

20. A method for modifying a lift, the method comprising:
- separating a lift-arm and a lift-frame of the lift;
- coupling the lift-arm to a joint;
- coupling the lift-frame to the joint, opposite the lift-arm, such that the lift-frame is revolvable relative to the lift-arm about a lift-axis that is parallel to a pitch-axis of the lift-frame and such that the lift-frame is revolvable relative to the lift-arm about a joint-axis that is parallel to a roll-axis of the lift-frame;

coupling a lift-drive assembly to the lift-arm and to the joint such that actuation of the lift-drive assembly revolves the lift-frame relative to the lift-arm about the lift-axis; and coupling a roll-drive assembly to the lift-frame and to the joint such that actuation of the roll-drive assembly revolves the lift-frame relative to the lift-arm about the joint-axis coupling a roll-arm to the joint such that the roll-arm revolves about the lift-axis with the lift-frame; and coupling a roll-drive to the roll-arm and to the lift-frame such that actuation of the roll-drive revolves the lift-frame relative to the lift-arm about the joint-axis.

* * * * *